United States Patent [19]

Zwack et al.

[11] Patent Number: 4,666,970

[45] Date of Patent: May 19, 1987

[54] CATAPHORETIC ELECTRODEPOSITION BATHS CONTAINING WATER-SOLUBLE LEAD SALTS

[75] Inventors: Robert R. Zwack, New Kensington; Robert D. Jerabek, Glenshaw, both of Pa.

[73] Assignee: PPG Industries, Inc., Pittsburgh, Pa.

[21] Appl. No.: 648,341

[22] Filed: Sep. 6, 1984

Related U.S. Application Data

[60] Continuation of Ser. No. 154,183, May 28, 1980, abandoned, which is a continuation of Ser. No. 910,987, May 30, 1978, abandoned, which is a division of Ser. No. 785,154, Apr. 6, 1977, Pat. No. 4,115,226.

[51] Int. Cl.$^4$ ................................................ C08K 3/24
[52] U.S. Cl. ................................. 524/399; 204/181.7
[58] Field of Search .......................................... 524/399

[56] References Cited

U.S. PATENT DOCUMENTS

| | | | |
|---|---|---|---|
| 3,488,272 | 1/1970 | Frisch et al. | 260/29.2 IN |
| 3,682,814 | 8/1972 | Gilchrist | 204/181 C |
| 3,692,714 | 9/1972 | Keyman et al. | 260/18 PN |
| 3,799,854 | 3/1974 | Jerabek | 204/181 |
| 3,922,212 | 11/1975 | Gilchrist | 204/181 R |
| 4,036,795 | 7/1977 | Tomnaga | 260/18 PN |
| 4,210,506 | 7/1980 | Hoppe et al. | 204/181 C |

OTHER PUBLICATIONS

Translation of "Metal-Filled---", Lakokrasoch. Mater Ikh. Primen, 1972, (5), 9-12, by Vl'Berg et al., supplied by applicant.
Translation of "Anticorrosion--", Fiz-Khim Mekhliofil Nost Dispersnkhsist (No. 3), 97-102 (1971) by Vl'Berg et al., supplied by applicant.
Translation of Belgian Patent No. 836333 of Apr., 1976, supplied by ap.
Handbook of Chemistry & Physics, 1963, Chemical Rubber Co., p. 1740.
Deinega et al, "Kolloidnyl Zhurnal", 37, No. 4, Jul.-Aug. 1975, pp. 768-773, translation provided by applicant.
Deinega et al, "Cathodic Code Position of Metals and Polymers," Kolloidnyi Zhurnal, 37, No. 4, Jul.-Aug. 1975, pp. 691-695.

Primary Examiner—Paul R. Michl
Attorney, Agent, or Firm—William J. Uhl

[57] ABSTRACT

Cataphoretic electrodeposition baths for coating ferrous metal articles, particularly untreated ferrous metal articles, are disclosed. The baths comprise aqueous dispersions of cationic electrodepositable resins and lead ions which are introduced into said bath by the addition of water-soluble lead compounds. Coatings electrodeposited on ferrous metal articles from such baths have excellent corrosion resistance.

3 Claims, No Drawings

CATAPHORETIC ELECTRODEPOSITION BATHS CONTAINING WATER-SOLUBLE LEAD SALTS

This application is a continuation of application Ser. No. 154,183, filed May 28, 1980, now abandoned, which is a continuation of application Ser. No. 910,987, filed May 30, 1978, now abandoned, which is a division of application Ser. No. 785,154, filed Apr. 6, 1977, now U.S. Pat. No. 4,115,226.

BACKGROUND OF THE INVENTION

1. Field of the Invention

The present invention relates to cataphoretic electrodeposition baths and to the use of these baths in cationic electrodeposition of ferrous metal articles, particularly untreated ferrous metal articles.

2. Brief Description of the Prior Art

Electrodeposition of aqueous organic coatings has risen to industrial prominence in recent years. The process has many advantages including uniformity and completeness of coating, even on intricate shapes. The process results in labor savings and pollution abatement. Virtually any electrically conductive substrate can be coated. However, the process has been primarily employed to prime ferrous metal substrates.

Particular interest has recently arisen in cationic electrodeposition coatings, that is, coatings which deposit on the cathode, since when the article is the cathode, there is greatly reduced metal ion dissolution which commonly causes poor corrosion resistance and staining in certain anionic systems.

Examples of suitable cationic electrodepositable resins are those described in U.S. Pat. Nos. 3,799,854 and 3,984,299, both to Jerabek, and 3,947,338 and U.S. Patent application Ser. No. 648,982, filed Jan. 14, 1976, now U.S. Pat. No. 4,569,368, both to Jerabek, Marchetti and Zwack. The cationic solubilizing groups in these resins are amine acid salts. Also suitable for cationic electrodeposition are quaternary ammonium salt group-containing resins such as those described in U.S. Pat. Nos. 3,962,165 and 4,001,156 to Bosso and Wismer.

Although cationic electrodepositable resins offer significant improvement over anionic electrodepositable resins, it has been noticed that for maximum corrosion resistant coatings over ferrous metal, the metal must be pretreated before it is electrocoated. Examples of pretreatments are the phosphating treatments which include iron phosphating, mixed iron and calcium phosphating and zinc phosphating. Such pretreatments may optionally be followed by a chromic acid rinse. The pretreatment operations, although employed on many industrial electrodeposition lines, are undesirable for a number of reasons. First of all, pretreatments are expensive. Besides the cost of the chemicals themselves, a considerable capital investment is required for equipment. In addition, pretreatments cause pollution problems, the solutions of which add to their expense.

Another and perhaps more important problem associated with pretreatment is the difficulty in applying a uniform pretreatment. With complexed shaped articles, such as automobile rocker panels and the inside surfaces of doors, it is very difficult to apply uniformly the pretreatment chemical. Also, the pretreatment equipment itself may not be operating in a uniform manner resulting in some areas being poorly pretreated. These areas will be the first to corrode and will ruin the entire article. Also, in the case of pretreating steel, there are many grades of steel which may require different degrees of pretreatment. Also, the quality and condition of the steel is important and may not be accurately known by the one doing the pretreatment. Steel of poor quality such as oily steel or steel contaminated with some impurity may detrimentally effect or at least reduce the effect of the pretreatment.

Therefore, it would be desirable to provide a cationic electrodeposition bath which can do away with the need for chemical pretreatment or at least compensate for any shortcomings or deficiencies in the pretreatment process.

SUMMARY OF THE INVENTION

In accordance with the present invention, an improved method for preparing an electrodeposition bath which comprises dispersing a cationic electrodepositable resin in water and optionally with pigments, solvents and other coating composition additives is provided. The improvement comprises adding to the electrodeposition bath a water-soluble lead compound in an amount sufficient to provide from 50 to 3000 parts per million lead based on total bath weight. The amount of water-soluble lead compound being sufficient such that it will provide corrosion resistance of a ferrous metal article, particularly an untreated or poorly treated ferrous metal article, which is cathodically electrocoated in said bath. The lead compound is soluble to the extent of at least 1 percent by weight in water having a pH of 7. In addition, it has also been found that the lead ion retards corrosion of iron parts of the electrodeposition bath.

PERTINENT PRIOR ART

Belgian Pat. No. 836,333 discloses electrodeposition baths containing cationic electrodepositable resins. The baths are modified by adding water-soluble salts whose potential in the cationic electrochemical series is higher than the potential of the ferrous metal surface being electrocoated in the bath. Among the metal salts specifically disclosed are salts of copper, cobalt, cadmium, zinc, nickel, tin and antimony. Lead is specifically not mentioned in the patent as being useful. Surprisingly, it has been found in the practice of the present invention that water-soluble lead compounds are superior to many of the water-soluble salts disclosed in the Belgian patent in terms of providing for improved corrosion-resistant coatings.

U.S. Pat. No. 3,799,854 to Jerabek discloses cationic electrodeposition baths which contain amine salt group-containing resinous binders. Besides the binders, the paint in these baths contain various pigments including basic lead silicate. The lead silicate is introduced into the bath in the form of a pigment paste.

The electrodeposition baths of the present invention differ from those of Jerabek in that they contain lead introduced into the bath from the addition of a water-soluble lead compound, whereas the lead in Jerabek is in the form of a water-insoluble lead pigment. Although some of the insoluble lead may dissolve in the bath over a period of time if the pH is low enough, the amount would probably not be sufficient to provide for optimum corrosion resistance. Also, the amount would depend on the pH of the bath. In fresh baths based on quaternary ammonium salt group-containing resins which have a pH of about 7, insufficient amounts of lead pigment are dissolved.

DETAILED DESCRIPTION

As mentioned above, the lead compound which is added to the electrodeposition bath is water soluble which means the lead compound is soluble in water having a pH of 7 to the extent of at least one percent by weight based on total solution weight. Suitable lead compounds are lead salts of organic acids such as acetic and lactic acids. The lead salts of strong mineral acid such as hydrochloric acid and nitric acid are not preferred because of poor coating properties. Examples of other suitable lead compounds include lead salts or complexes of amino acids such as glycine, sarcosine; ethylene diamine tetra-acetic acid, N-(2-hydroxyethyl-)ethylene dinitrilo triacetic acid, citric acid and ascorbic acid.

Many of the desirable lead compounds are commercially available products. However, many of the salts can be prepared by reacting lead oxide with the appropriate acid in aqueous medium.

The amount of lead compound which is added to the electrodeposition bath should be that sufficient to provide for improved corrosion resistance on a ferrous metal particularly an untreated or poorly treated ferrous metal article which is cathodically electrodeposited in said bath. The improved degree of corrosion resistance is determined by comparing salt spray exposures of coatings deposited from electrodeposition baths in accordance with the present invention with coatings deposited from electrodeposition baths to which no water-soluble lead salt has been added. Although very low amounts of lead will provide some protection, the amount of water-soluble lead compound which is added to the bth is usually at least 50 and preferably from 100 to 3000 and more preferably from 200 to 3000 parts per million (by weight) of lead in the bath based on total bath weight. Lead levels above 3000 parts per million do not offer any significant advantage in terms of corrosion protection and as the level of soluble lead in the bath increases, properties such as film builds, rupture voltage and bath conductivities suffer.

The addition of the water-soluble lead compound to the electrodeposition bath can be by adding the soluble lead compound directly to the electrodeposition bath containing pigment and resin or to a high solids paint which must be thinned with water to form the bath or by adding the soluble lead compound to the aqueous resinous dispersion or pigment dispersion before the bath is formulated. As the electrodeposition proceeds, the lead compound should be replenished since it is consumed during the course of the electrodeposition.

The metallic articles which are coated in the process of the invention are ferrous metals such as iron, steel, and various alloys thereof with other metals. The invention has particular utility with untreated ferrous metals such as cold rolled steel. By untreated is meant the ferrous metal has not been pretreated with chemicals which enhance the corrosion resistance of the metal. Examples of such pretreatments are the phosphating and chromating treatments mentioned above. However, the invention is also applicable to such pretreated ferrous metals, particularly poorly treated ferrous metals.

The cationic electrodeposition resins which can be used in the practice of the invention include amine salt group-containing resins which are well known in the art for cationic electrodeposition. An example of suitable resinous systems are those disclosed in U.S. Pat. No. 3,799,854 to Jerabek. Particularly preferred amine salt group-containing resins are the reaction products of an organic polyepoxide and a secondary amine. The resinous reaction product is solubilized with acid to provide the amine salt groups. Such resins are described in U.S. Pat. No. 3,984,299 to Jerabek. Usually these amine salt group-containing resins are used in combination with a blocked isocyanate curing agent. In one embodiment, the isocyanate is fully blocked. The above immediately-mentioned two patents describe such systems. Also, the isocyanate can be partially blocked and reacted with the resin to form a one-component system. Such a resinous system is described in U.S. Pat. No. 3,947,358 to Jerabek and Marchetti.

A particularly preferred amine salt group-containing resin is one which contains latent primary amine groups blocked by ketimine functionality. Such a resin is described in U.S. Pat. No. 3,947,339 to Jerabek, Marchetti and Zwack.

Besides amine salt group-containing resins, quaternary ammonium salt group-containing resins can also be employed. Examples of these resins are those formed from reacting an organic polyepoxide such as a polyglycidyl ether of a polyphenol with a tertiary amine acid salt. Such resins are described in U.S. Pat. Nos. 3,962,165, 3,975,346 and 4,001,156 to Bosso and Wismer. In one preferred embodiment, the quaternary ammonium salt group-containing resin contains blocks isocyanate moieties. Resinous systems of ths type are described in U.S. Pat. No. 3,935,087 to Jerabek and Marchetti.

Examples of other cationic resins are ternary sulfonium salt group-containing resins such as those described in U.S. Pat. No. 3,793,278 to DeBona.

For electrodeposition, the above-described resinous reaction products are dispersed in water to about a 1 to 30 percent by weight resin solids aqueous dispersion. The term "aqueous dispersion" as used within the context of the present invention is intended to cover 2-phase, translucent, aqueous-resin systems, especially those in which the aqueous phase forms the continuous phase, and is also intended to cover homogeneous aqueous solutions which appear optically clear. The aqueous dispersions of the present invention have dispersed phases which have average particle size diameters of about 0.1 to 5 microns. The dispersed phase may be spherical or elongated in shape or actually invisible by microscopic investigation.

The products can be employed as such to electrodeposited clear films, but ordinarily they are used as vehicles along with the pigment composition. The pigment composition used may be any of the conventional types, for example, iron oxides, lead silicate, strontium chromate, carbon black, titanium dioxide, talc, barium sulfate and the like, as well as combinations of these and similar pigments. Color pigments such as cadmium yellow, cadmium red, phthalocyanine blue, chromic yellow, toluidine red, hydrated iron oxides and the like may also be included. Dispersing agents which should be of the non-ionic or cationic type or a combination of these types may optionally be employed. A particularly preferred dispersing agent is the resinous pigment grinding vehicle disclosed in U.S. Pat. No. 4,007,154 to Schimmel et al.

Usually the pigment and dispersing agent are bound together to make a paste and this is blended with a major portion of the vehicle to produce a coating composition.

There may also be included in the coating composition additives such as anti-oxidants, wetting agents, dryers, anti-foaming agents, suspending agents and the like. It is often desirable to include small amounts of water-miscible organic solvents, which may be added to the resinous vehicle to aid in handling and processing. Examples of such solvents are 4-methoxy-4-methyl-pentanone-2, and other solvents such as dioxane and glycol ethers can be used.

It has been found in most instances that desirable coatings are obtained using pigmented compositions containing weight ratios of pigment to vehicle of 1.5:1 or less and preferably less than about 1:1. If the composition has too high a pigment-to-vehicle ratio, the electrodeposition film may deposit with poor flow characteristics.

In formulating the water-dispersed compositions, ordinary tap water may be employed. However, such water may contain a relatively high level of cations, which, while not ordinarily rendering the process inoperative, may result in variations in the properties of the baths when used for electrodeposition. In such cases, it is often desirable to utilize deionized water from which the free ions have been remmoved, as by passage through an ion exchange resin.

In the electrodeposition process employing the aqueous coating compositions described above, the aqueous composition is placed in contact with an electrically conductive anode and an electrically conductive cathode, with the surface to be coated being the cathode. Upon passage of the electric current between the anode and the cathode, while in contact with the bath containing the coating composition, an adherent film of the coating composition is deposited on the cathode. This is in contrast to the processes utilizing polycarboxylic acid resins which deposit on the anode, and many of the advantages described in the process of the present invention are in a large part attributed to this cathodic deposition.

The conditions under which electrodeposition is carried out are, in general, similar to those used in electrodeposition of other types of coatings. The applied voltage may be varied greatly and can be, for example, as low as one volt or as high as several thousand volts, although typically between 50 volts and 500 volts are employed. Current density is usually between about 1.0 ampere and 15 amperes per square foot and tends to decrease during electrodeposition.

After deposition, the coating is cured at elevated temperatures by any convenient method, such as baking in ovens or with banks of infrared heat lamps. Curing temperatures depend principally on the curing agent employed, and when the curing agent is a blocked isocyanate such as described above, curing is usually accomplished at between 75° to 300° C.

The invention will be described further in conjunction with several examples showing the method and practice of the invention. These examples, however, are not to be construed as limiting the invention to their details.

EXAMPLES 1-7

A series of experiments were conducted involving the addition of various water-soluble lead, nickel, zinc and copper salts to aqueous dispersions of cationic electrodepositable resins. The resins were then electrodeposited onto untreated steel panels; the coatings were baked and evaluated for corrosion resistance.

The cationic electrodepositable resin was an amine salt group-containing resin and was prepared from the following charge:

| Ingredient | Parts by Weight |
|---|---|
| EPON 1001[1] | 122 |
| methyl butyl ketone | 42.5 |
| monourethane of 2,4-toluene diisocyanate[2] (95% solids in methyl butyl ketone) | 83.0 |
| dibutyltin dilaurate | 0.18 |
| diketimine of diethylene triamine[3] | 9.9 |
| diethylamine | 8.0 |
| JEFFAMINE D-1000[4] | 21.9 |
| hexyl CELLOSOLVE[5] | 24.1 |
| deionized water | 356 |
| lactic acid (88% in water) | 13.1 |

[1]EPON 1001 - polyglycidyl ether of Bisphenol A possessing an equivalent weight of 492 per epoxy group, commercially available from Shell Chemical Company.
[2]2-ethylhexylmonourethane of 2,4-toluene diisocyanate prepared by adding 1953 parts of 2-ethylhexanol to an agitated mixture of 2610 parts of 2,4-toluene diisocyanate and 2 parts of methyl butyl ketone over approximately a 3-hour period with external cooling to maintain the reaction temperature below 18° C. After the addition was complete, the product was stored under dry nitrogen until used.
[3]Diketimine derived from one mole of diethylene triamine and two moles of methyl isobutyl ketone, commercially available from Shell Chemical Company as curing agent H-1.
[4]Polyoxypropylene diamine having a molecular weight of about 1000, commercially available from Jefferson Chemical Company.
[5]Monohexyl ether of ethylene glycol.

The cationic electrodepositable resin was prepared as follows: In a suitable reaction vessel, the EPON 1001 was dissolved in the methyl butyl ketone and refluxed for about one hour to remove any water present by the use of a decanting trap in the distillate return line. After cooling to 100° C., the 2-ethylhexyl monourethane of 2,4-toluene diisocyanate and the dibutyltin dilaurate ctalyst were added and the reaction mixture heated to 115° C. for about one-half hour until all the NCO was consumed as indicated by an IR scan.

The batch was then cooled to 80° C. and the Shell H-1 added followed by the addition of the diethylamine. The resulting exotherm was controlled by external cooling, keeping the temperature below 95° C. After holding for 35 minutes, the JEFFAMINE D-1000 was then added and the batch heated to 110° C. and held for about three hours at which time the hexyl CELLOSOLVE was added. The reaction mixture was then thinned with deionized water and acidified with the lactic acid to form the cationic resin which had a solids content of about 37 percent.

The cationic electrodepositable resin prepared as described above was diluted with additional deionized water to form an approximately 12 percent solids electrodeposition bath. To six separate portions of the bath were added sufficient lead lactate, nickel lactate, lead acetate, zinc acetate, nickel and copper acetate to give baths containing 0.5 percent by weight (based on resin solids) of the respective metals. One bath with no added metal salt served as a control.

Untreated steel panels were then cathodically electrodeposited in these baths at standard electrocoating conditions as reported in Table I below. The coatings were baked for 20 minutes at 400° F. (204° C.); the baked coatings were scribed with an "X" and placed in a salt spray chamber at 100° F. (38° C.) at 100 percent relative humidity atmosphere of a 5 percent by weight aqueous sodium chloride solution for the period of time shown in Table I below, after which time the creepage from the scribe mark was measured and is also reported in Table I below.

TABLE I
Metal Salt Addition to Cationic Electrodeposition Baths

| Example No. | Metal Salt | Coating Voltage | Coating Time in seconds | Film Thickness in mils | Salt Spray Exposure Time in days | Scribe Creepage in inches |
|---|---|---|---|---|---|---|
| 1 | none, control | 100 | 90 | 0.8 | 13 | >⅛ |
| 2 | lead lactate | 100 | 90 | 1.0 | 13 | <1/16 |
| 3 | nickel lactate | 100 | 90 | 0.8 | 13 | ⅛ |
| 4 | lead acetate | 200 | 90 | 0.16 | 10 | 0 |
| 5 | zinc acetate | 200 | 90 | 0.40 | 10 | >⅛ |
| 6 | nickel acetate | 200 | 90 | 0.35 | 10 | 1/16-⅛ |
| 7 | copper acetate | 200 | 90 | 0.20 | 10 | >1/16 |

EXAMPLES 8-16

A series of experiments were conducted to show the effect of the addition of various amounts of water-soluble lead salts to cationic electrodeposition baths. It was found that as little as 500 parts per million water-soluble lead based on resin solids gave good corrosion resistance on untreated steel. Above this level, corrosion resistance was not significantly improved, and film builds, throwpower and electrodeposition bath conductivity suffered as the amount of lead increased.

In addition, two experiments were conducted with water-soluble copper and manganese salts and these were found to give unacceptable coating properties.

The resin was prepared as generally described above in connection with Examples 1-7 and had a solids content of about 37 percent.

A cationic pigment dispersant was prepared by heating 744.2 parts of stearyl glycidyl ether (Procter and Gamble's EPOXIDE 45) and 166.6 parts of ethylene glycol monobutyl ether to about 50° C. and adding 150.2 parts of n-methylethanolamine over a 30-minute period with external cooling to keep the batch temperature below 100° C. When all the amine was added, the batch was held an additional hour at 100° C. before cooling and storage.

To prepare a grinding vehicle from this cationic pigment dispersant, 188 parts were blended with 40 parts of 88 percent aqueous lactic acid, 440 parts of deionized water and 132 parts of ethylene glycol monobutyl ether.

To prepare a pigment paste, 90 parts of this grinding vehicle were blended with 4 parts of an acetylenic alcohol defoamer (SURFYNOL 104-A), 60 parts of phthalocyanine blue, 140 parts of iron oxide brown and 306 parts of deionized water, and the rsultant slurry ground in a Jiffy mill to a Hegman No. 7.

The cationic electrodepositable resin of Examples 1-7 and the pigment paste prepared as described above were combined with deionized water and additional dibutyltin dilaurate catalyst in the following charge ratio to form a cationic electrodepositable paint:

| Ingredient | Parts by Weight |
|---|---|
| cationic resin | 1053 |
| deionized water | 840 |
| dibutyltin dilaurate | 7.4 |
| pigment paste | 228 |
| deionized water | 1672 |

The resin and dibutyltin dilaurate were mixed in a Cowles mixer for one hour and diluted with the first portion of deionized water. The pigment paste was then added followed by final dilution with the second portion of deionized water. The paint had a solids content of about 12 percent.

Nine electrodeposition baths, including a control, were prepared from the above-described paint. To six of the electrodeposition baths were added increasing amounts of lead acetate. Copper acetate was added to one bath and manganese acetate was added to the final bath. The amount of soluble salts added to the bath is reported in Table II below. Untreated steel panels were electrodeposited in these baths at 250 volts for two minutes. The film builds and appearance of the coatings are reported in Table II below. Also reported is the Ford throwpower, rupture voltage and conductivity of the various electrodeposition baths.

TABLE II
Cationic Electrodeposition Bath Containing Various Types and Amounts of Water-Soluble Salts

| Example No. | Parts per Million Metal Derived from Soluble Salt | Film Builds in mils | Ford Throwpower inches | Rupture Voltage | Conductivity | Coating Quality |
|---|---|---|---|---|---|---|
| 8 | 0 | 0.50 | 8¼ | 360 | 1040 | smooth |
| 9 | 500 - lead | 0.40 | 8¼ | 300 | 1200 | smooth |
| 10 | 1000 - lead | 0.40 | 8 | 300 | 1280 | smooth |
| 11 | 1500 - lead | 0.30 | 7¾ | 300 | 1310 | smooth |
| 12 | 2000 - lead | 0.27 | — | 300 | 1380 | smooth |
| 13 | 2500 - lead | 0.24 | — | 300 | 1380 | smooth |
| 14 | 3000 - lead | 0.20 | — | 280 | 1450 | smooth |
| 15 | 1250 - copper | 0.30 | — | 300 | 1350 | rough |
| 16 | 1250 - manganese | 0.30 | — | 250 | 2420 | rough |

EXAMPLES 17-32

A first series of experiments was conducted to show the effect of adding a water-soluble lead salt to a cationic paint based on a quaternary ammonium salt group-containing resin.

The quaternary ammonium salt group-containing resin was prepared from the following charge:

| Ingredient | Parts by Weight |
|---|---|
| EPON 829 | 5428.3 |
| Bisphenol A | 1752.3 |
| 2-ethylhexanol monourethane of 2,4-toluene diisocyanate, 95% in methyl | 3900.8 |

-continued

| Ingredient | Parts by Weight |
| --- | --- |
| isobutyl ketone | |
| PCP-0200[1] | 1424.8 |
| TEXANOL[2] | 1167.3 |
| dimethyl ethanolamine | 25.8 |
| lactic acid (88% in water) | 52.3 |
| ethylene glycol phenyl ether | 1830.5 |
| ethylene glycol ethyl ether | 857.0 |
| FOAMKILL 639[3] | 66.5 |
| dimethyl cyclohexyl amine lactate (75% in water) | 1600.7 |
| deionized water | 857.0 |

[1]Polycaprolactone diol commercially available from Union Carbide Corporation having a molecular weight of 530.
[2]2,2,4-trimethyl pentanediol monoisobutyrate.
[3]A hydrocarbon oil-containing inert diatomaceous earth.

The EPON 829 and Bisphenol A were charged to a reaction vessel and heated to 150° C. and allowed to exotherm to 202° C. The reaction mixture was cooled to 125° C. and the 2-ethylhexyl monourethane added. The reaction mixture was cooled to 120° C. and held for one hour followed by the addition of TEXANOL, PCP-0200 and the dimethyl ethanolamine. The reaction mixture was heated to 125° C. and held for 8½ hours followed by the addition of the glycol ethers, FOAMKILL 639, lactic acid, dimethyl cyclohexyl amine lactate, and deionized water. The reaction mixture was cooled to 85° C. and held for two hours followed by cooling to room temperature.

A pigment grinding vehicle was prepared from the following charge:

| Ingredient | Parts by Weight | Solids |
| --- | --- | --- |
| EPON 829[1] | 710.0 | 681.2 |
| Bisphenol A | 289.6 | 289.6 |
| 2-ethylhexanol monourethane of 2,4-toluene diisocyanate in methyl isobutyl ketone | 406.4 | 386.1 |
| quaternizing agent[2] | 496.3 | 421.9 |
| deionized water | 71.2 | — |
| butyl CELLOSOLVE[3] | 56.8 | — |

[1]Epoxy resin solution made from reacting epichlorohydrin and Bisphenol A having an epoxy equivalent of approximately 193-203, commercially available from Shell Chemical Company.
[2]Quaternizing agent was prepared from the following charge:

| Ingredient | Parts by Weight | Solids |
| --- | --- | --- |
| 2-ethylhexanol half-capped toluene diisocyanate in methyl isobutyl ketone | 320.0 | 304 |
| dimethyl ethanolamine | 87.2 | 87.2 |
| aqueous lactic acid solution | 117.6 | 88.2 |
| butyl CELLOSOLVE | 39.2 | — |

The 2-ethylhexanol half-capped toluene diisocyanate was added to the dimethyl ethanolamine in a suitable reaction vessel at room temperature. The mixture exothermed and was stirred for one hour at 80° C. Lactic acid was then charged, followed by the addition of butyl CELLOSOLVE. The reaction mixture was stirred for about one hour at 65° C. to form the desired quaternizing agent.
[3]Ethylene glycol monobutyl ether.

The EPON 829 and Bisphenol A were charged under a nitrogen atmosphere to a suitable reaction vessel and heated to 150°-160° C. to initiate an exotherm. The reaction mixture was permitted to exotherm for one hour at 150°-160° C. The reaction mixture was then cooled to 120° C. and the 2-ethylhexanol half-capped toluene diisocyanate added. The temperature of the reaction mixture was held at 110°-120° C. for one hour, followed by the addition of the butyl CELLOSOLVE. The reaction mixture was then cooled to 85°-90° C., homogenized and then charged with water, followed by the addition of the quaternizing agent. The temperature of the reaction mixture was held at 80°-85° C. until an acid value of one was obtained.

A pigment paste, employing the pigment grinding vehicle described immediately above, was prepared from the following charge:

| Ingredient | Parts by Weight |
| --- | --- |
| resinous grinding vehicle | 12.2 |
| coal dust | 15.8 |
| basic lead silicate | 1.9 |
| strontium chromate | 1.0 |
| dibutyltin oxide | 0.68 |
| deionized water | 23.6 |

The paste was ground in a sand mill to a Hegman No. 7 grind.

A cationic electrodepositable paint was prepared from the following charge:

| Ingredient | Parts by Weight |
| --- | --- |
| quaternary ammonium salt group-containing resin | 1580 |
| PARAPLEX WP-1, plasticizer (Rohm and Haas) | 36 |
| deionized water | 3800 |
| pigment paste | 682 |
| deionized water | 1102 |

The quaternary group-containing resin was premixed with the PARAPLEX WP-1. Deionized water was added slowly and carefully with high agitation until the dispersion had thinned sufficiently to add the pigment paste. The remaining water was added relatively quickly with agitation.

The paint prepared as described above had a solids content of about 20 percent, a pH of 6.5 and a conductivity of 1100. Both zinc phosphated and untreated steel panels were electrodeposited with this paint. The coated panels were cured at the various times and temperatures reported in Table III below, scribed and exposed to salt spray as described above in connection with Examples 1 through 7. The results are reported in Table III below as Examples 17-20.

To the paint as described above was added lead lactate so that the paint contained 500 parts per million lead. Both zinc phosphated and untreated steel panels were electrodeposited with this paint. The coated panels were cured at the various times and temperatures reported in Table III below, scribed and exposed to salt spray as discussed above in connection with Examples 1-7. The results are reported in Table III below as Examples 21-24.

A second series of experiments was conducted similar to the first series mentioned immediately above with the exception that the lead silicate and strontium chromate were removed from the paint.

A pigment paste similar to that prepared immediately above but containing no lead silicate nor strontium chromate was prepared from the following charge:

| Ingredient | Parts by Weight |
| --- | --- |
| resinous grinding vehicle[1] | 342 |
| deionized water | 130 |
| carbon black | 29.2 |
| clay | 262.8 |

-continued

| Ingredient | Parts by Weight |
|---|---|
| dibutyltin oxide | 10.2 |

[1] 1600 parts of the resinous grinding vehicle described above thinned with 1400 parts of deionized water.

The paste was ground in a Jiffy Mill to a Hegman No. 7 grind.

The cationic electrodepositable paints were prepared from the following charge:

| Ingredient | Parts by Weight |
|---|---|
| quaternary ammonium salt group-containing resin | 790 |
| PARAPLEX WP-1, plasticizer | 18.0 |
| deionized water | 1900 |
| pigment paste with no lead silicate or strontium chromate | 316 |
| deionized water | 576 |

The paint had a solids content of 20 percent, a pH of 6.6 and a conductivity of 1100. Both zinc phosphated and untreated steel panels were electrodeposited with this paint. The coated panels were cured at the various times and temperatures described in Table III below, scribed and exposed to salt spray. The results are reported in Table III below as Examples 25–28.

To the paints as described immediately above was added lead lactate, such that the paint contained 500 parts per million lead. Both zinc phosphated and untreated steel panels were electrodeposited with this paint. The coated panels were cured at the times and temperatures as described in Table III below, scribed and exposed to salt spray. The results are reported in Table III below as Examples 29–32.

| Ingredient | Parts by Weight |
|---|---|
| EPON 1001 | 122 |
| normal butyl ketone | 44 |
| 2-ethylhexyl monourethane of 2,4-toluene diisocyanate | 83 |
| dibutyltin dilaurate | 0.18 |
| Shell H-1 | 9.6 |
| diethylamine | 11.5 |
| JEFFAMINE D-1000 | 21.25 |
| hexyl CELLOSOLVE | 24.3 |
| deionized water | 364 |
| lactic acid (88% in water) | 15.5 |

The resin was prepared in the manner generally described above in connection with Examples 1–7.

A pigment grinding vehicle was prepared by blending 321 parts of stearyl glycidyl ether (EPOXIDE 45) and 40 parts of 88 percent aqueous lactic acid and 439 parts of deionized water.

To prepare a pigment paste, 90 parts of this grinding vehicle were blended with 4 parts of SURFYNOL 104-A, 300 parts of deionized water, 198 parts of titanium dioxide and 2 parts of carbon black. The resultant slurry was ground in a Jiffy mill to a Hegman No. 7 grind.

A cationic electrodepositable paint was prepared by mixing in a Cowles mixer the following ingredients:

| Ingredient | Parts by Weight |
|---|---|
| cationic electrodepositable resin | 2896 |
| dibenzyl ether | 112 |
| dibutyltin dilaurate | 11.2 |
| deionized water | 2730 |
| pigment paste | 795 |

TABLE III

Effects of Water-Soluble Lead in Cationic Electrodepositable Paints

| Example No. | Substrate | Bake Schedule °F. (°C.)/minutes | Film Thickness in mils | 14 Days Salt Spray Exposure, Scribe Creepage |
|---|---|---|---|---|
| 17 | zinc phosphated steel | 350° F. (177° C.)/45 | 0.7 | 1/32 |
| 18 | untreated steel | " | 0.75 | ⅛ |
| 19 | zinc phosphated steel | 400° F. (204° C.)/20 | 0.7 | 1/32 |
| 20 | untreated steel | " | 0.8 | ⅛ |
| 21 | zinc phosphated steel | 350° F. (177° C.)/45 | 0.7 | 1/32 |
| 22 | untreated steel | " | 0.75 | 3/64 |
| 23 | zinc phosphated steel | 400° F. (204° C.)/20 | 0.7 | 1/32 |
| 24 | untreated steel | " | 0.8 | 1/16 |
| 25 | zinc phosphated steel | 350° F. (177° C.)/45 | 0.6 | 1/32 |
| 26 | untreated steel | " | 1.0 | ⅛ |
| 27 | zinc phosphated steel | 400° F. (204° C.)/20 | 0.6 | 1/32 |
| 28 | untreated steel | " | 1.0 | 5/32 |
| 29 | zinc phosphated steel | 350° F. (177° C.)/45 | 0.6 | 1/32 |
| 30 | untreated steel | " | 0.9 | 1/32 |
| 31 | zinc phosphated steel | 400° F. (204° C.)/20 | 0.6 | 1/32 |
| 32 | untreated steel | " | 0.9 | 1/32 |

EXAMPLES 33–35

A series of experiments were conducted involving the addition of strontium, barium and manganous lactate to aqueous dispersions of cationic electrodepositable resins. The resins were then electrodeposited onto untreated steel panels; the coatings were baked and evaluated for corrosion resistance and appearance.

The cationic electrodepositable resin was an amine salt group-containing resin similar to that of Examples 1–7 prepared from the following charge:

Three portions of the cationic electrodepositable paint were diluted with deionized water and combined with strontium, barium and manganous lactate, respectively, to form 12 percent solids electrodeposition baths containing 1000 parts per million strontium, barium and manganese. The pH and conductivities of the baths and appearance of the electrodeposited films on untreated steel panels are reported in Table IV below.

TABLE IV

Electrodeposition Baths Containing Various Lactate Salts

|  | Strontium Lactate | Barium Lactate | Manganous Lactate |
|---|---|---|---|
| pH | 5.7 | 5.6 | 4.7 |
| Conductivity | 1820 | 1575 | 2060 |
| Film Appearance | rough | rough | smooth |

The coated panels were subjected to salt spray and were found to be no better in performance than an untreated steel control panel electrocoated with a similar paint but containing no added lactate salt.

We claim:

1. In a method for preparing an electrodeposition bath comprising dispersing in aqueous medium a cationic electrodepositable coating composition containing cationic resins and optionally pigments, solvents and other coating composition additives, the improvement comprising adding to said bath a water-soluble lead salt of an organic acid in an amount sufficient to provide from 50 to 3000 parts per million lead based on total bath weight; the amount of water-soluble lead being sufficient such that it will improve the corrosion resistance of a ferrous metal article which is cathodically electrocoated in said bath, the lead compound being soluble to the extent of at least 1 percent by weight in water having a pH of 7.

2. The method of claim 1 in which the water-soluble lead compound is added to the bath in an amount sufficient to provide from 100 to 3000 parts per million lead.

3. The method of claim 1 in which the water-soluble lead salt is selected from the class consisting of lead acetate and lead lactate.

* * * * *